March 18, 1952 — J. E. REED — 2,589,431
QUANTITATIVE FEEDER FOR ICE PLANTS
Filed May 6, 1947 — 2 SHEETS—SHEET 1

JULIAN E. REED,
Inventor

Attorney

March 18, 1952  J. E. REED  2,589,431
QUANTITATIVE FEEDER FOR ICE PLANTS
Filed May 6, 1947  2 SHEETS—SHEET 2
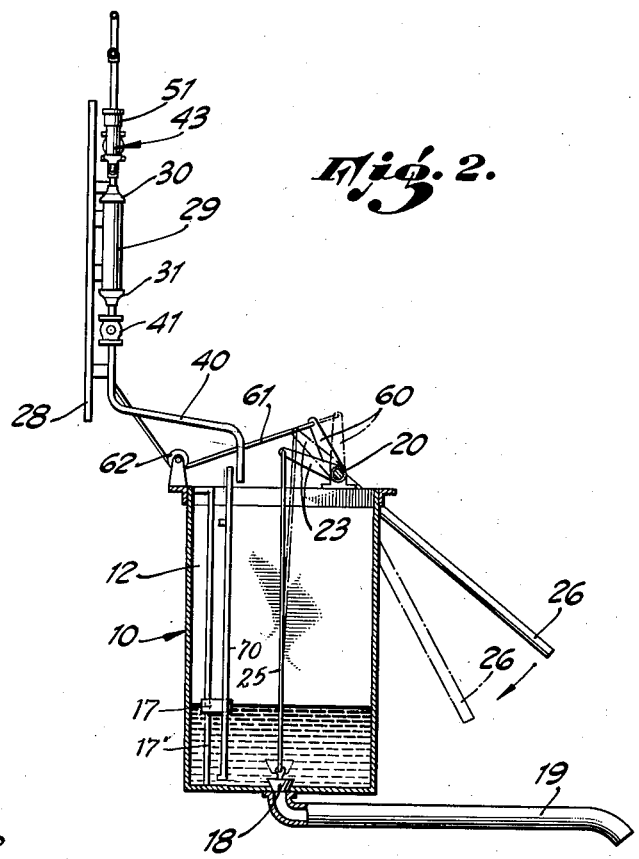
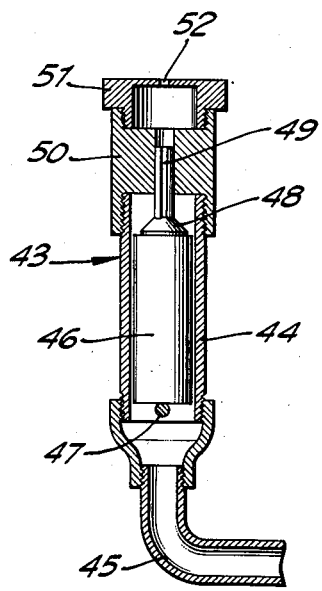
JULIAN E. REED,
Inventor
By
Attorney Patented Mar. 18, 1952

2,589,431

UNITED STATES PATENT OFFICE 2,589,431

QUANTITATIVE FEEDER FOR ICE PLANTS

Julian E. Reed, Pacific Palisades, Calif., assignor, by mesne assignments, to Zenith Processing Corporation, Los Angeles, Calif., a corporation of California Application May 6, 1947, Serial No. 746,343

5 Claims. (Cl. 222—67)

1

This invention relates to improvements in apparatus particularly adapted for use in plants manufacturing water ice and, more specifically, is directed to an apparatus for mixing a predetermined quantity of treating fluid with water from which ice is to be manufactured.

It has been heretofore discovered, as disclosed in an application for United States Letters Patent Serial 669,096, filed May 11, 1946, now Patent No. 2,509,579, by Jagan N. Sharma, that the life of water ice may be materially increased by introducing a minute quantity of certain chemicals or treating agents into the water before it is frozen or solidified. These peculiar treating agents are used in very small quantities and do not appear to lower the freezing point of the solution to any measurable extent. However, the ice formed from these solutions has a characteristic fracture, appears to be harder and tougher and has very remarkable lasting qualities. These lasting qualities make the ice particularly well adapted in refrigerating shipments of fruit and vegetables, since one application of crushed ice to a car of such fruits or vegetables adequately maintains the contents of a car at a desirably low temperature even on a transcontinental shipment, thereby obviating the necessity of re-icing enroute.

Great difficulty has been experienced in adding the treating agent in regulatable quantities within the desired limits to the large volumes of water employed in ice manufacturing operations, and this invention is particularly directed to a combination of elements and to an arrangement of devices whereby this desirable result may be attained without necessitating alterations or major changes in the normal ice manufacturing equipment.

It is an object of the present invention, therefore, to disclose and provide a quantitative feeder whereby small amounts, such as quantities between about 0.0001% and 0.1%, of a treating agent may be added to water or other liquid.

A further object is to disclose and provide an arrangement and combination of elements whereby small quantities of a treating agent may be added to water without disturbing the normal operations conducted during the manufacture of water ice.

These and other objects, advantages and results, capable of being attained by the present invention, will become apparent to those skilled in the art from the following detailed description from an exemplary form of apparatus. In order to facilitate understanding, reference will be had to the appended drawings in which:

2

Fig. 2 is a side vertical section on line II—II of the arrangement indicated in Fig. 1.

Fig. 3 is a longitudinal section, enlarged, of a breather utilized in the apparatus.

Figure 1:
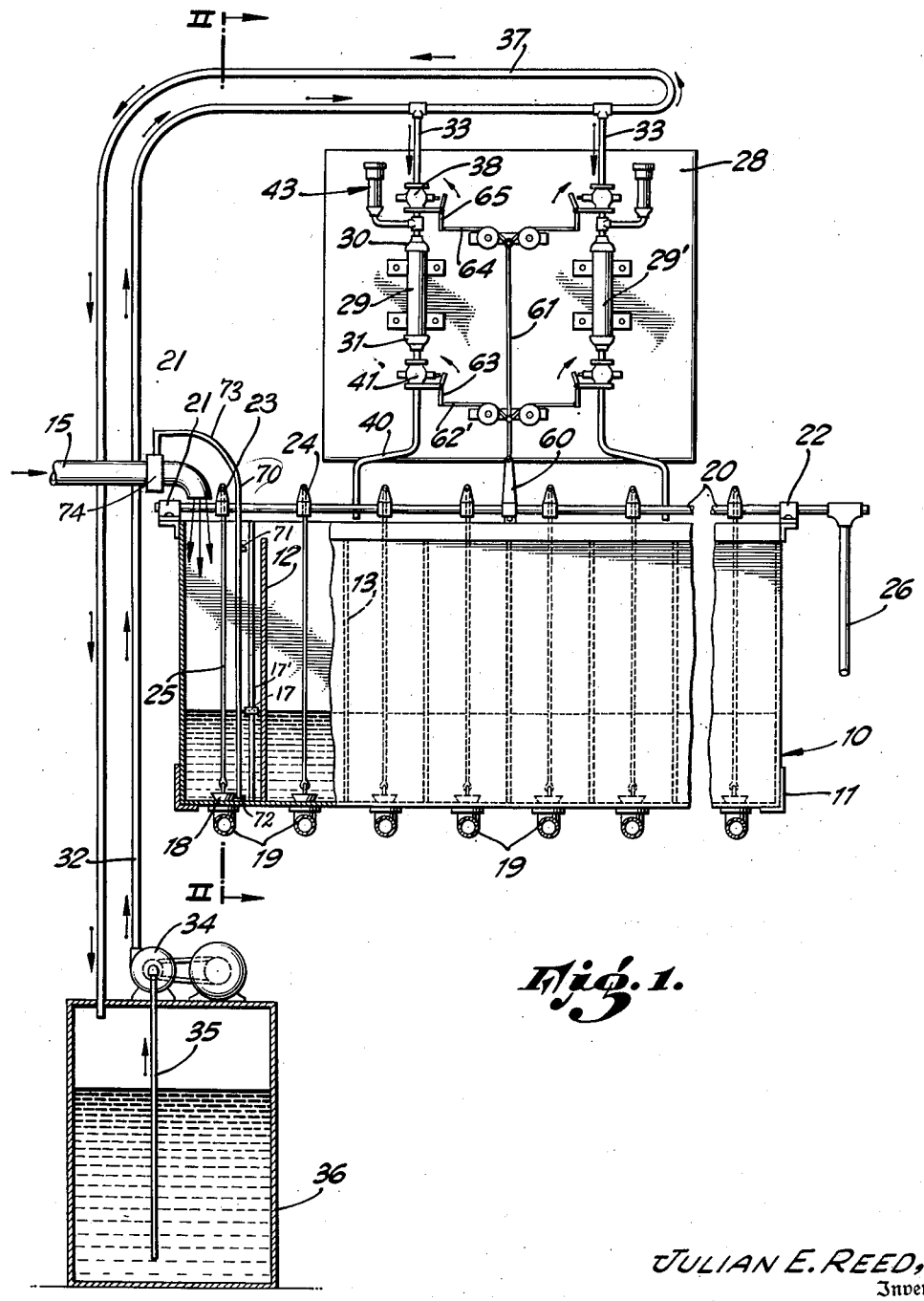
Fig. 1 is a front elevation, partly diagrammatic, of an arrangement of elements whereby the objects of this invention may be attained.

It is customary in ice manufacturing plants to employ a dump tank of the character shown at 10, this tank being normally positioned at a suitable elevation above the conveyor, upon which are carried the individual cans in which the water is eventually frozen to solidification. Normally, each of these cans contains approximately 300 pounds of water, and in order to expedite the filling of such cans with water, the dump tank 10 is first filled with water and then, after the individual cans have been suitably arranged thereunderneath, the water from the dump tank is rapidly transferred to the individual can.

As indicated in Fig. 1, the dump tank 10 may be suitably supported upon horizontally extending angle irons and beams 11 and contain a plurality of vertical partitions, such as 12, 13, etc., dividing the tank into sections, each of which contains the amount of water necessary to fill a can. The partitions 12, 13, etc., are generally shorter than the outer walls of the dump tank, so that when water is admitted to the tank through the supply line 15, all of the divisions of the tank are rapidly filled. The supply line is ordinarily provided with a control valve such as 74 and a float mechanism is provided in the dump tank for the purpose of shutting off the supply of water whenever the level within the tank reaches a predetermined and desired height. A float 17 may be vertically slidable upon a stationary guide 17', such float being capable of actuating a control lever 70 connected to the valve 74 by a means 73, whenever the float 17 contacts suitably spaced lugs 71 and 72 carried by thee control rod 70. The valve 74 is opened whenever the float 17 engages lug 72 and the valve 74 is closed when the float 17 engages stop 71 and raises the control rod.

The bottom of the tank is provided with a plurality of ports, each of which is normally closed by means of a valve 18. One of these ports is arranged in the bottom of each section of the dump tank 10 and the ports so closed by the valves 18 communicate with a spout 19.

Means are provided for simultaneously opening the various dump valves 18 and discharging water through the spouts 19 into their respective cans. Such means normally comprise a rocker shaft 20 journaled in suitable bearings 21 and 22, carried by the upper edge portion of tank 10. The rocker shaft 20 carries a plurality of levers 23, 24, etc., each of said levers being connected to its correlated dump valve by means of an actuating rod or cable 25. The end of the rocker shaft 20 carries an actuating lever 26 whereby the operator may cause a partial rotation of the rocker shaft and lift all of the dump valves simultaneously whenever he is ready to fill the cans.

Above these customary appurtenances of an ice plant I now provide a quantitative feeder. This feeder may be mounted upon a panel 28, positioned above the dump tank. Upon this panel there is mounted a receptacle 29, whose volumetric contents are correlated to the volume or weight of water in the dump tank. In the drawings, two of these receptacles 29 and 29' are shown, but the description of one may be deemed to be repeated for the other. Obviously, if two such receptacles are used, their total volumetric capacity is correlated to the volume of water in the dump tank, the contents of such receptacles being discharged into the dump tank every time such tank is filled.

Each of the receptacles 29 is provided with an inlet 30 at the top and an outlet 31 at the bottom. The inlet port is connected to a conduit leading to a source of supply of treating liquid. In the example a supply conduit 32 leads from the discharge side of a pump 34 (whose suction line 35 extends to the bottom of a reservoir 36 containing treating agent), such supply conduit 32 being provided with branch lines 33 leading to the inlets of the receptacles. The conduit 32 then becomes a return line 37 whereby excess treating agent may be returned to the reservoir 36.

The inlet conduit 33 is provided with a normally closed biased inlet valve 38. Any quick-acting normally closed valve may be used.

A discharge conduit 40 leads from the outlet 31 of the receptacle 29 to the dump tank 10. A normally open valve 41 is positioned in such discharge conduit. Again, any type of quick-acting spring biased normally open valve may be used.

The normally closed valve 38 is preferably in close proximity to the inlet port 30, and an air bleeder is provided between such valve and the receptacle 29; such air bleeder is generally indicated by the numeral 43 and is arranged to automatically open and close in accordance with the supply of treating agent to the receptacle 29. The air bleeder is shown in greater detail in Fig. 3 and comprises a float chamber 44, suitably connected at its lower end as by means of a coupling 45 to the supply conduit 33 at a point between the valve 38 and the receptacle 29. A large sensitive loosely fitting float 46 is positioned within the float chamber 44. Its downward movement may be limited by means of a spider or pin 47. Such float may support a light-weight valve 48, carried by a fluted stem 49, slidably fitting the axial bore of a head element 50, carried by the float chamber 44. A dust cap 51, provided with an air port 52, may surmount the entire assembly. It will be evident that when the float is in its lowermost position, as indicated in Fig. 3, air may pass through the port 52, through or past the fluted stem 49 and downwardly past the float 46, through connection 45 into the upper portion of the receptacle 29. In its upper position the float 46 will seat the valve 48 against the seat formed at member 50, thereby effectively shutting off the supply of air. It will be understood that other float operated means for closing the air inlet may be utilized.

The apparatus of this invention is designed to slowly add a predetermined quantity of treating fluid from the reservoir 29 to the dump tank 10, while such tank is being filled, and to automatically replenish receptacle 29 with a predetermined quantity of treating agent when the dump tank is being discharged into the cans.

Means are provided, therefore, for closing the discharge valves 41 and opening the inlet valves 38 so as to fill the receptacle 29 with treating agent while tank 10 is being dumped. In the drawings, such means comprise a lever 60, mounted upon the rocker shaft 20, the end of said lever being connected to a cable 61, which passes under a shive 62 and then upwardly between the receptacles 29 and 29'. This cable 61 is connected by branch lines 62' to the actuating levers 63 by means of which valves 41 may be closed. The upper end of the cable 61 is also connected by branch lines 64 to actuating levers 65 by means of which valves 38 may be opened. Suitable shives or guiding pulleys are provided for more effectively directing the force of the cable 61.

It will be apparent that when the dump tank is being discharged, the lever 26 is in the dash line position indicated in Fig. 2, so that tension has been applied to the cable 61, causing closure of valves 41 and an opening of valves 38. A constant stream of treating fluid passes through supply line 32, and such treating fluid is admitted through the open valve 38 into receptacle 29. Air contained in such receptacle is blown out through the device 43. When the receptacle 29 has been filled, the float 46 is raised seating valve 48 upon its seat and closing the air outlet. Overflow or discharge of treating agent through the bleeder 43 is thus prevented. Excess treating agent is returned to the receptacle 36 by line 37.

When the lever 26 is moved back into its normal position (dump valves 18 being thus closed), additional water is supplied to the dump tank through supply conduit 15. While the dump tank is filling, the treating agent is being slowly discharged through the small diameter discharge line 40 and open valve 41 into the dump tank for admixture with the water. Adequate agitation is provided by reason of the constant flow of incoming water. While the treating fluid is being discharged from receptacle 29, air is being admitted through port 52, since the float 46 drops as soon as valve 41 is opened.

Numerous changes and modifications may be made without departing from the spirit of the invention herein disclosed. All changes and modifications coming within the scope of the appended claims are embraced thereby.

I claim:

1. In an ice plant, in combination with a dump tank for water, including a water supply line provided with a valve, a plurality of dump valves in the bottom of the tank and pivoted lever means for opening said dump valves: a receptacle positioned above the dump tank and provided with an inlet at the top and an outlet at the bottom and arranged to contain a predetermined volume of treating fluid; a conduit means connecting the inlet with a supply of treating liquid; a normally closed, biased inlet valve in the inlet conduit; a discharge conduit leading from the outlet of the receptacle to the dump tank; a normally open valve in said discharge conduit and means, operable by movement of the pivoted lever to open the dump valves, for closing the discharge valve and opening the inlet valve to fill the receptacle with treating fluid.

2. In an ice plant, in combination with a dump tank for water, including a water supply line provided with a valve (operable by float means arranged to close the valve when the tank is full), a plurality of manually openable dump valves in the bottom of the tank: a receptacle positioned above the dump tank and provided with an inlet at the top and an outlet at the bottom and arranged to contain a predetermined volume of treating fluid; conduit means connecting the inlet with a supply of treating liquid; a normally closed, biased inlet valve in the inlet conduit; a discharge conduit leading from the outlet of the receptacle to the dump tank; a normally open valve in said discharge conduit and means, operably connected to the dump valves, for closing the discharge valve and opening the inlet valve to fill the receptacle with treating fluid while the tank is being dumped.

3. In an apparatus of the character stated in claim 1, the provision of: a float chamber connected to the conduit between the inlet valve and receptacle; an air inlet into the top of the float chamber and means including a float for closing the air inlet when said receptacle is full of liquid.

4. In an apparatus of the character stated in claim 2, the provision of: a float chamber connected to the conduit between the inlet valve and receptacle; an air inlet into the top of the float chamber and means including a float for closing the air inlet when said receptacle is full of liquid.

5. Apparatus for mixing a predetermined quantity of treating fluid with a stream of water flowing into a dump tank in an ice manufacturing plant, said dump tank including a plurality of dump valves in the bottom thereof, comprising: a receptacle positioned above the dump tank and provided with an inlet at the top and an outlet at the bottom and arranged to contain a predetermined volume of treating fluid; conduit means connecting the inlet with a supply of treating liquid; a normally closed, biased inlet valve in the inlet conduit; a discharge conduit leading from the outlet of the receptacle to the dump tank; a normally open valve in said discharge conduit and means, operably connected to the dump valves, for closing the discharge valve and opening the inlet valve to fill the receptacle with treating fluid while the tank is being dumped.

JULIAN E. REED.

REFERENCES CITED

The following references are of record in the file of this patent:

UNITED STATES PATENTS

| Number | Name | Date |
| --- | --- | --- |
| 1,007,176 | Bartlett | Oct. 31, 1911 |
| 1,826,704 | Byrne | Oct. 13, 1931 |
| 1,879,051 | Blood | Sept. 27, 1932 |
| 2,286,432 | Monsarrat | June 16, 1942 |